March 7, 1944.  F. P. PORTER  2,343,421
TORSIONAL VIBRATION DAMPER
Filed July 31, 1942  2 Sheets-Sheet 1
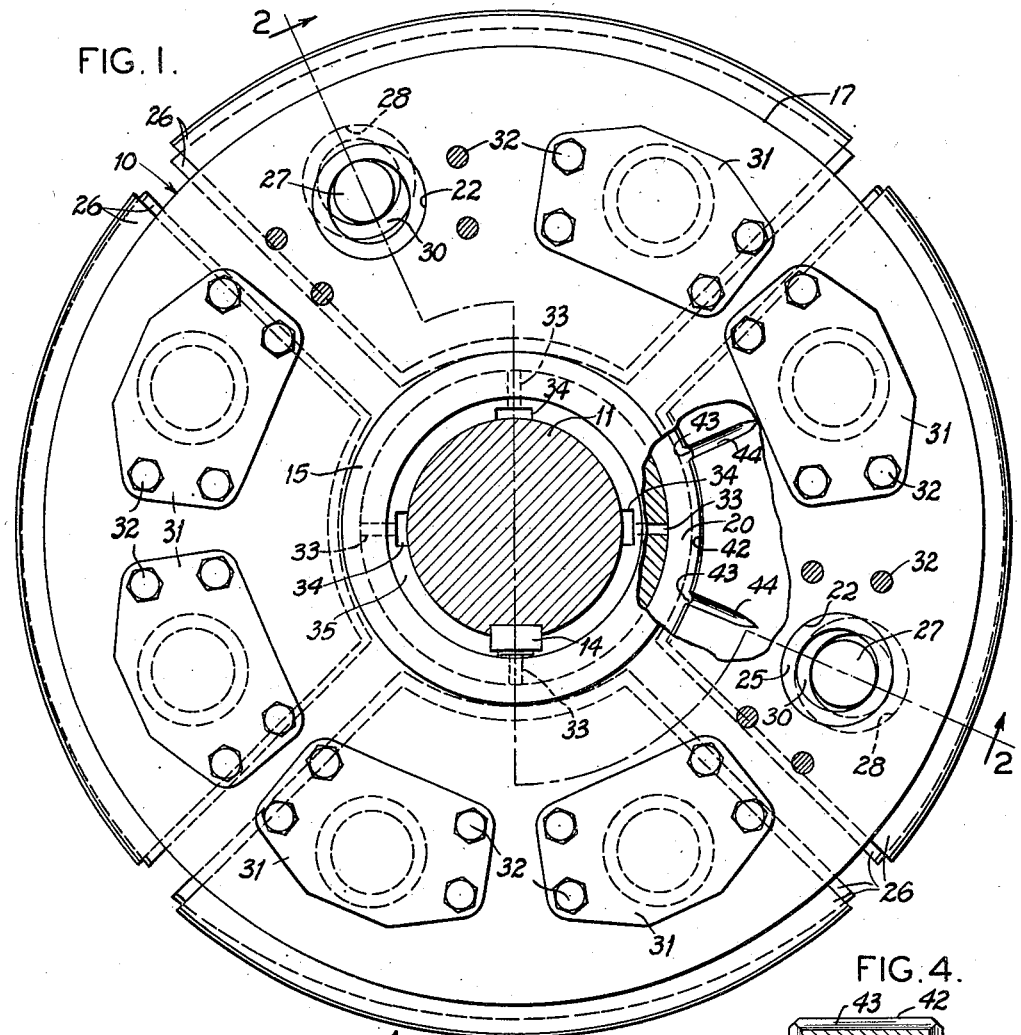
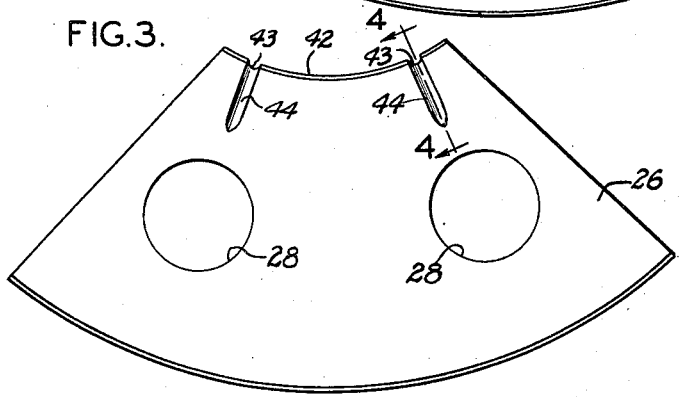
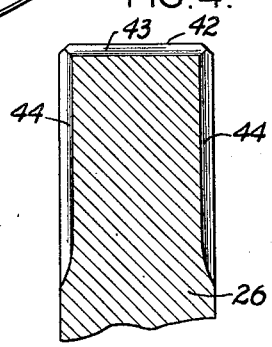
INVENTOR:
FREDERIC P. PORTER
BY Paul L. Kosher
ATTORNEY Patented Mar. 7, 1944

2,343,421

UNITED STATES PATENT OFFICE 2,343,421

TORSIONAL VIBRATION DAMPER

Frederic P. Porter, Beloit, Wis., assignor to Fairbanks, Morse & Co., Chicago, Ill., a corporation of Illinois Application July 31, 1942, Serial No. 452,982

2 Claims. (Cl. 74—574)

The present invention relates generally to vibration dampers for rotatable shafts and more particularly to a damper structure having certain improved features of construction to permit of a more compact assembly, and further, one in which the principles of the so-called bifilar system of pendulum counterweight suspension has been utilized to great advantage.

The general theory and principle of operation of the vibration damper forming the basis of the present invention is comprehensively embodied in Patent No. 2,112,984 issued to Roland Chilton. Vibration dampers of the broad type herein disclosed are generally referred to as bifilar dampers, wherein the counterweights or pendulum masses are suspended on roller elements which loosely engage pairs of spaced bores in the mass supporting member and the body of the mass or counterweight. By this method of suspension, the counterweight is endowed with the properties of a simple pendulum, having a pendulum length equal to the difference in diameter between the roller elements and bores, the bores comprising arcuate tracks for supporting and limiting displacement of the pendulum masses against centrifugal forces.

Accordingly, a principal object of the invention resides in the provision of a simple, yet compact pendulum mass-supporting member or spider, in which the pendulum masses may be oscillatably suspended for operation, either in axially spaced groups having the same pendular characteristics for a given axial zone or in groups in a single axial zone, the latter groups having differing pendular characteristics.

Another important object of the invention resides in the general form and construction of the pendulum weight supporting member or spider structure, together with the particular provision of extremely hard bushing elements carried in the spider structure and cylindrical roller members mounted therein, such that the high contact loads or extreme unit pressures between the roller members and bushing elements, will be cared for without impairing the operation of the damper.

Yet another object of the present invention includes the provision of means for conducting lubricating oil from a suitable reservoir or collection chamber formed in the pendulum-supporting spider structure to distribution ducts or channels provided in the pendulum weights for ultimate delivery to the pendulum weight suspension rollers and the cooperating bushing elements.

Further objects and advantages of the invention will be pointed out in the following description of a preferred embodiment thereof when considered in view of the accompanying drawings, in which:

Fig. 1 is an end elevational view of the damper assembly with portions thereof broken away, the better to illustrate certain details of the invention;

Fig. 3 is a plan view of a typical pendulum weight member illustrating the positions of certain of the oil collecting and distributing ducts, and Fig. 4 is an enlarged, fragmentary sectional view of the pendulum member as seen along line 4—4 of Fig. 3.

Figure 2:
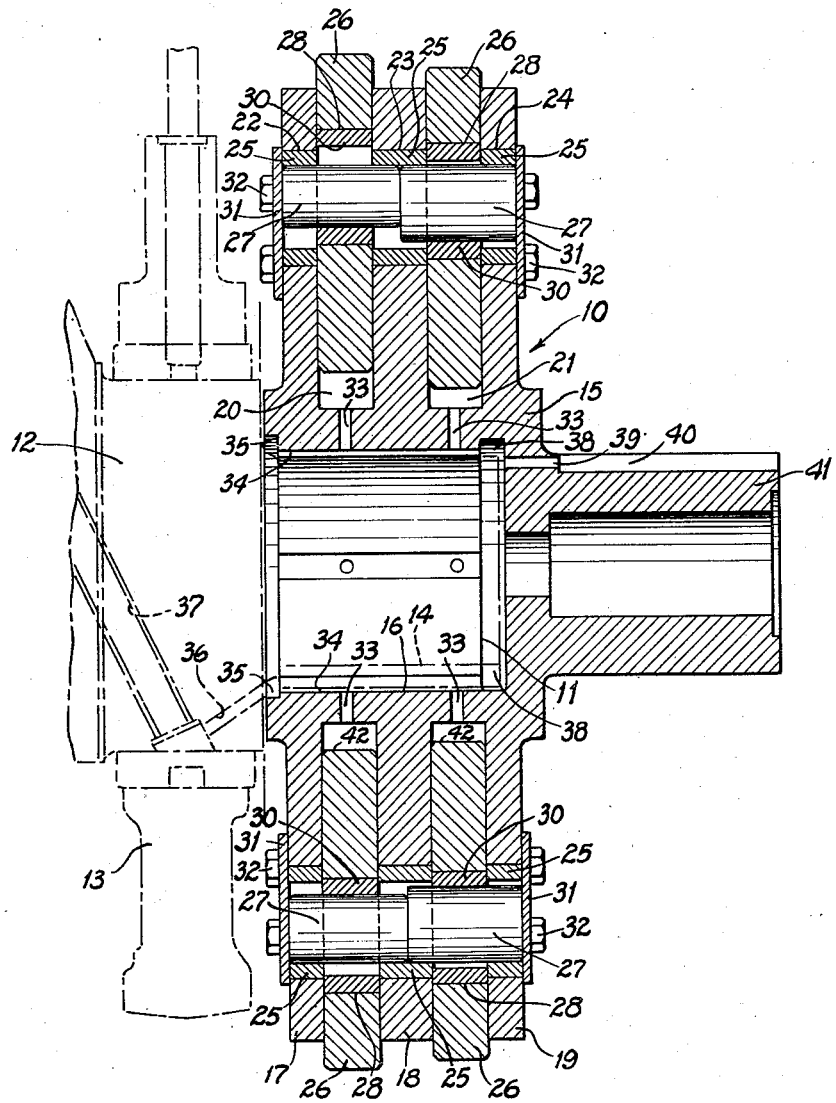
Fig. 2 is a sectional view of the assembled damper structure as seen along line 2—2 of Fig. 1.

Throughout the following detailed description of the damper structure, like numerals of reference will serve to indicate similar parts and elements thereof. Accordingly, and with particular reference to Figs. 1 and 2 of the drawings, the vibration damper body or spider 10 is shown as mounted on the projecting end portion 11 of shaft 12, the shaft 12 being supported for rotation in a bearing 13 of usual construction. The spider 10 is non-rotatably secured to the shaft portion 11 by means of a key element 14. The spider structure 10 consists of a hub portion 15, centrally recessed at 16 for shaft mounting thereof, and integral plate or radial flanges 17, 18 and 19, arranged in axially spaced, concentric relation thereon. Thus there is provided, between adjacent flanges, a series of intervening annular spaces or slots 20 and 21. Each of the spider plates or flanges 17, 18 and 19 is provided with a series of circumferentially spaced bores or apertures 22, 23 and 24 respectively. The adjacent bores in each of the several plate elements are also arranged in axial alignment and in inwardly spaced relation with respect to the peripheral margins thereof, as clearly indicated in Fig. 2. A bushing element or member 25 is secured in each of the apertures in the several plates 17, 18 and 19, as by means of a press fit or in any other suitable manner.

A plurality of pendulum members or weights 26, each of identical weight and general configuration, are positioned in the annular slots 20 and 21 of the spider 10. Each of the pendulum members 26 has a working clearance between its lateral faces and the adjacent faces of the associated flanges, such that undesirable face contact will be precluded and the consequent frictional resistance will not interfere with the free, oscillatory or wobble movement thereof. Suspension of the pendulum members in the annular slots is effected by means of a pair of identical roller pin elements or pivot members 27, loosely engaging the bushing elements 25 on each side of the adjacent weight and extending through suitable pairs of apertures or bores 28 formed in the weight members 26, as indicated. The bores 28 are provided with hardened bushing elements 30, positioned therein as by means of a press fit or otherwise. As indicated in Fig. 1, each of the pendulum members, in the several axially spaced zones, is constrained to a swinging or oscillatory movement within certain maximum limits as defined by the rolling contact between the pivot element 27 and the supporting bushings 25 and 30 in the adjacent pairs of flanges 17—18 or 18—19, and the pendulum members respectively.

The assembly of the pendulum members 26 in the axially spaced, annular recesses or pendulum pockets 20 and 21 of the spider structure 10 is effected by inserting each member 26 so that the spaced bores 28 therein are aligned with the corresponding bores 24 in the adjacent flanges 17—18 defining recess 20, and 18—19 bounding the recess 21. The appropriate cylindrical roller elements 27 are then axially inserted so as to be in endwise abutment in a median plane of the center flange or plate 18, as clearly shown in Fig. 2. The several pivots 27 are then properly positioned for rolling contact with hardened bushings 25, in the spider, and for operative support of the pendulum member 26, associated therewith. After assembly of the members 26 and pivots 27, as above described, cover plates 31 are positioned over the outer pin apertures and are secured in place by suitable machine screws or bolts 32. Thus each pair of internally abutting pivot members 27 is prevented from further axial displacement. The damper unit is then in condition for assembly on the end portion 11 of shaft 12, as described.

In operation, the damper pendulum members 26 are free to wobble or oscillate on the roller members 27, but only in a plane normal to the shaft axis. Thus pendular motion occurs as a result of the difference in the diameter of the roller member and the apertures or bores provided in the spider and counterweight. Due to the weight of the pendulums and the resulting centrifugal forces set up, it is important to form each of the several parts and elements of the assembly of a suitable material capable of sustaining such forces. Consequently, it is preferred to utilize a tough, forged steel spider structure and to provide special hardened bushings for the spider bores and pendulum apertures. The bushings may best be formed by beryllium-copper having a hardness of the order of 300–400 Brinell. The several pivot elements 27 are formed of nickel-molybdenum steel, characterized by a minimum hardness of the order of 600 Brinell. The straight shank, cylindrical pivot or roller element is preferred herein, as the more usual flanged pivot element has a marked tendency to fracture under the influence of high stresses, particularly at the zone of the flange. Hence, the plain pivot element obviates such difficulty and produces better operational results. Endwise abutment of the pivot pins in the mid zone of the center plate 18 facilitates assembly of the pendulums and permits of a more compact damper structure.

In the damper organization herein disclosed, it can be seen that a group of four pendulum members 26 is operatively suspended in each of the axially spaced, annular recesses 20 and 21. First considering the group of pendulum members 26 positioned in the annular pocket 20, it will be noted that there are two diametrally related pairs of pendulum organizations, each pair differing from those of the other pair in that the suspending roller members 27 are of different diameters. For example, the set of roller members 27 for the pair of pendulum members 26 shown in vertical relation, are of smaller diameter than those of the corresponding roller members 27 for the horizontally illustrated pair of members 26. Thus, the vertical pair of pendulum members will have a differing pendular characteristic than that of the horizontal pair. Consequently, the grouping of the pendulum members, in the axial zone of annular recess 20, will react to and dampen out at least two orders of torsional vibrations or harmonics in shaft 12. It is preferred that these pendulum members be diametrally paired to preserve the initial static and dynamic balance of the shaft with which they are associated. It is to be noted, that the selected order of vibration to be damped, will dictate the roller pin diametrical dimension, such that the desired length of pendulum arm will be secured and importantly so, in order to attain an effective counteracting wobble or oscillating movement in the pendulum member for that order of vibration. Although for convenience and production economy, differing permissible amplitudes of pendulum movement are provided in the example shown, by utilizing rollers or pins of differing diameters, it will now have become obvious that the differing pendular characteristics of the masses of the different groups are attained essentially by the provision of differing clearances between rollers or pins, and the bores thereof. Accordingly, it is of course possible, and within the realm of the present developments, to utilize either or both differing diameters of rollers and differing diameters of bushing or bores in the weights traversed by the pin elements. For brevity of present description and as applicable to the structure illustrated, it will be supposed that certain of the elements 27 differ in diameter from each other in the same axial grouping of pendular masses, and may also differ between the two (or more) axially spaced groups of pendulum assemblies.

The group of pendulum members 26 operatively mounted in the annular recess 21 are each mounted or suspended on pairs of pivot members 27, each pivot thereof being illustrated as of the same or identical diameter. Hence, this group of pendulums 26, there being four thereof, will be rendered effective to dampen out only a single order of vibration. It is important to note here that, while the present disclosure embodies a damper construction, including axially spaced groups of pendulum members which are capable of damping out three orders of vibration, the principal intention is to provide a damper structure in which the axially spaced groups of pendulum members may be selectively paired to achieve greater effectiveness of the whole damper unit. That is to say, the damper may be arranged effectively to counteract one or more orders of shaft vibration, as desired or as dictated by the characteristics of the shaft and associated engine or other apparatus when in rotation.

Again considering Figs. 1 and 2, the hub or body portion 15 of spider 10 is further formed to provide groups of circumferentially spaced ducts or passages 33, of a substantially radial trend, and each group thereof so axially located as to open into the bottom surface of each of the pendulum pockets 20 and 21. The inner ends of these passages communicate with suitable, axially directed channels 34, each extending throughout the length of the shaft receiving recess 16 of hub 15. An annular chamber 35, formed in the inner face of hub 15, communicates with each of the axial channels 34 formed in recess 16, and with a duct 36, the latter being formed in the journal portion of shaft 12. The duct 36, in turn, communicates with a second duct or bore 37 provided in the shaft 12. Hence, lubricating oil supplied under pressure to the shaft journal through duct 37, in the usual manner as by an engine lube oil pump (not shown), is picked up by duct 36 and conveyed to the annular chamber or reservoir 35. From this reservoir 35, the oil is evenly distributed along each of the channels 34 and eventually flows into and through the ducts 33. Excess oil, not delivered to ducts 33, continues on and is collected in an outer annular recess 38, formed in the bottom of the shaft pocket or recess 16 of hub 15, as shown to best advantage in Fig. 2. A small axial bore 39 leads from recess 38 into a channel 40, of an outwardly extending shaft member 41, formed on hub 15. This latter member provides a convenient location for mounting suitable accessory elements (not shown) to be powered by shaft 12. Oil supplied to ducts 33 is intended to be utilized in lubricating the pendulum pivot members 27 and associated bearing elements or bushings 25. For this purpose, oil collected in the bottom of pendulum pockets 20 and 21, respectively, flows onto the inner marginal surfaces 42 of the pendulum weights 26, and is there distributed in a manner now to be described.

A typical pendulum member 26, as illustrated in Fig. 3, comprises a fan-shaped, solid body having curved outer and inner, concentric sector margins on two opposite sides, and converging straight margins on the other opposite sides. Spaced apertures 28 formed in the pendulum serve as pivot bearings for suspension of the body in the spider 10, as described. The inner curved margin 42 is further formed to provide a pair of spaced, transverse ducts 43 positioned in a zone radially inwardly of the apertures 28 with respect to the axial center of shaft 12. From each end of these transverse ducts 43, additional ducts 44, formed in the lateral faces of the pendulum, extend substantially radially outwardly in a direction toward the center of the apertures 28. The form and dimensions of the lateral ducts 44 are governed by the structural requirement and strength of material required at the zone of the apertures 28, such that the pendulum may withstand the high centrifugal forces with safety. Further details of the position, form and relation of the pendulum ducts 43 and 44 may be had upon reference to Fig. 4 of the drawings.

Referring again to Fig. 1, and particularly the right hand pendulum member 26 of the horizontally paired group, the position and relation of duct 33, in the spider hub 15, with respect to the ducts 43 and 44 formed in the pendulum member, may be seen to best advantage. In the operation of the damper, lubricating oil collecting in reservoir 35 and under pressure, is delivered along the axial channel 34 and flows into the radial ducts 33, there being shown one such duct located centrally below each weight, in each of the axially spaced pendulum pockets 20 and 21. Centrifugal effects due to rotation of the spider, throw the oil across the bottom of the pendulum pockets 20 and 21 and onto the inner curved surface 42 of each pendulum 26. Further centrifugal effect causes the oil to spread out circumferentially along the surface 42. In the ordinary pendulum construction, this oil would eventually reach and flow outwardly along the diverging marginal edges of the pendulum and would not thereafter be available for lubricating purposes. However, in the present improved embodiment, the transverse and lateral ducts 43 and 44 respectively, provide means for constraining the oil to well defined paths, such that a positive supply of oil is provided for all pivot members 27 and supporting bushing 25. The provision of the transverse ducts 43 is particularly important, in that such ducts initially collect and then divert the oil to the lateral faces of the pendulums. This arrangement of itself would in many cases be sufficient to direct the oil toward the pivot pins, but because of the high unit pressures existing in those zones, a more copious bath of oil is to be desired. Consequently the directional ducts 44, in each lateral face of the pendulums, provide means for immediately delivering the desired quantity of oil to the zones of the high pressure. The foregoing arrangement and system of lubricating the load-supporting and operating elements of the damper organization, constitutes an important part of the present invention. It should be noted that lubricant delivered to the pivot members 27 and coacting bushing elements 25 does, in no way, interfere with or create any hydraulic resistance to the free movement of such elements. Any excess oil there delivered is discharged radially outwardly to the peripheral margins of the pendulum members 26 under the centrifugal effect of the damper when in rotation; hence there results a free radial flotation of the pivots and pendulums in the spider.

As attesting to the urgency and highly practical nature of the present improvements, it may be noted that so far as is known to this applicant, there has heretofore been made no specific provision for lubrication of the zones of highest unit pressure, in pendulum type torsional vibration dampers. Dampers of this type, particularly bifilar dampers, have exhibited a short life due to excessive wear, breakage and spalling effects not only in the weight pivot elements, but in the bores of the pendulums and pendulum supporting structure. This fact of frequent failure in heretofore existing designs, will attest to the high desirability of the use of materials of the orders of hardness specified, both for the bushings and for the pin or roller elements. It will now have become apparent that the problem has not only been attacked on a basis of better resistance of materials to the high unit pressures, but on the further basis of minimization of wear by the provision of high pressure lubricant supply means serving to direct oil in a positive manner to the wearing zones of the assembly which are subject to extreme unit pressures. Following a reasonable period of experience in the field, it may be noted that the present improvements result in an extremely long and entirely satisfactory life of vibration dampers of bifilar type.

Vibration damper assemblies of the type above described provide a compact structure embodying certain operating improvements and assembly advantages not heretofore attained. As an example of the utility of the present damper unit, particularly in connection with aircraft engine installations, it may be pointed out that present engine designs provide no more than a limited space for each of the essential parts of the engine proper and operating accessories. Hence, the available radial and axial space requirements dictate the structural and dimensional limitations of vibration dampers. Consequently, a simplified, trouble-free and efficient vibration damper assembly, of minimum dimensions and weight, is of first importance. What has been said in connection with the adaptability of the present damper structure to aircraft engines, applies equally to marine engine installations, as well as others.

The foregoing description of the vibration damper assembly and cooperating elements, is intended to illustrate only a single, preferred embodiment of the invention and should be considered in an instructive sense only, since certain changes and alterations may be effected therein without departing from the scope of the invention as defined by the appended claims.

I claim:

1. In combination with a rotatable shaft, a vibration damper carried by the shaft and including a spider, one or more pendulum weights carried by and constrained to vibrating movement with respect to the spider, each weight being of plate-like aspect and characterized by an inner marginal surface of appreciable extent, a lubricant reservoir formed in the spider inwardly of each pendulum weight, and means for supplying lubricant to said reservoir, the pendulum weight being formed to provide a lubricant duct transversely of its inner marginal surface and terminating in the lateral surfaces of the pendulum weight, supplied with lubricant from said reservoir, and being formed further, to provide lubricant ducts of substantially radial trend, one such duct extending along each lateral surface of the weight and communicating with the adjacent terminal end of said transverse duct.

2. In a torsional vibration damper for rotatable shafts, a unitary pendulum-support adapted for shaft mounting and including a hub portion and axially spaced, annular plate elements integral with the hub portion and defining therewith an annular recess, the inner opposed faces of the plate elements being planar and in substantial parallelism, pendulum elements arranged in diametric opposition in said recess, supporting pins for each pendulum element, each pin having a wobble connection with the associated pendulum element and being mounted for radial flotation in said plate elements, each of said pendulum elements having opposite planar sides in substantial parallelism and in guided contact with said inner planar faces of the plate elements, and an inner marginal surface serving to define with said recess, a lubricant reservoir beneath the pendulum element, means for supplying lubricant to the reservoir associated with each pendulum element, and each pendulum element being formed to provide lubricant ducts transversely in said inner marginal surface thereof, and lubricant ducts in each planar side thereof, extending substantially radially from said transverse ducts toward and terminating adjacently to, the zones of pendulum support as constituted by said pins in wobble connection with the pendulum element.

FREDERIC P. PORTER.